(12) United States Patent
Yoneyama

(10) Patent No.: US 11,504,848 B2
(45) Date of Patent: Nov. 22, 2022

(54) ROBOTIC PROGRAMMING APPARATUS

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 17/079,521

(22) Filed: Oct. 26, 2020

(65) Prior Publication Data

US 2021/0170593 A1 Jun. 10, 2021

(30) Foreign Application Priority Data

Dec. 4, 2019 (JP) .............................. JP2019-219554

(51) Int. Cl.
| | |
|---|---|
| B25J 9/16 | (2006.01) |
| B25J 11/00 | (2006.01) |
| B05B 13/04 | (2006.01) |
| B25J 13/08 | (2006.01) |

(52) U.S. Cl.
CPC ......... B25J 9/1664 (2013.01); B05B 13/0431 (2013.01); B25J 9/1671 (2013.01); B25J 11/0075 (2013.01); B25J 13/089 (2013.01)

(58) Field of Classification Search
CPC .... B25J 9/1664; B25J 9/1671; B25J 11/0075; B25J 13/089; B05B 13/0431
See application file for complete search history.

(56) References Cited

U.S. PATENT DOCUMENTS

| | | | | |
|---|---|---|---|---|
| 2007/0292599 | A1* | 12/2007 | Eickmeyer | .............. B05B 12/00 427/8 |
| 2009/0194418 | A1* | 8/2009 | Kawakami | ............ B05B 5/0255 204/434 |
| 2012/0004751 | A1* | 1/2012 | Nagatsuka | .............. G06F 30/20 700/98 |
| 2014/0205743 | A1* | 7/2014 | Streit | ...................... B05B 14/20 118/712 |
| 2017/0036232 | A1* | 2/2017 | Hoffman | .................. B05D 1/02 |
| 2018/0250829 | A1* | 9/2018 | Hashimoto | ............ B25J 9/1646 |
| 2019/0381529 | A1* | 12/2019 | Schaumberger | ...... B05B 9/0413 |

FOREIGN PATENT DOCUMENTS

| | | |
|---|---|---|
| JP | 4870831 B2 | 2/2012 |
| JP | 5340455 B1 | 11/2013 |

* cited by examiner

Primary Examiner — Kira Nguyen
(74) Attorney, Agent, or Firm — Hauptman Ham, LLP

(57) ABSTRACT

A robotic programming apparatus, while using a robot equipped with a spraying device to move the spraying device, for creating an operation program of an application operation for applying a sprayed material sprayed from a nozzle of a spraying device to a member, that includes an operation pattern storage section configured to store a plurality of types of operation patterns each indicating operation of the spraying device that are operation patterns each formed of a continuous trajectory including periodic iteration of a constant pattern, and a pitch interval determination section configured to determine, for one operation pattern of the plurality of types of operation patterns stored in the operation pattern storage section, a pitch interval of the periodic iteration of the constant pattern in the one operation pattern based on a spray parameter representing a spray characteristic of the sprayed material by the nozzle of the spraying device.

8 Claims, 17 Drawing Sheets

ROBOTIC PROGRAMMING APPARATUS

RELATED APPLICATIONS

The present application claims priority to Japanese Application Number 2019-219554, filed Dec. 4, 2019, the disclosure of which is hereby incorporated by reference herein in its entirety.

BACKGROUND OF THE INVENTION

1. Field of the Invention

The present invention relates to a robotic programming apparatus for programming a robot.

2. Description of the Related Art

When machining a workpiece with a tool mounted on a robot, an operation needs to be taught to the robot in advance. In teaching a robot, offline programming is often performed. With respect to the offline programming, JP 4870831 B describes "An application operation simulation device configured to, by a robot equipped with a spraying device provided with at least one nozzle, execute a simulation of an application operation for applying a sprayed material sprayed from the nozzle to a workpiece, while moving the spraying device based on an operation program thereof, and simultaneously display a three-dimensional model of the robot and a three-dimensional model of the workpiece on a screen, the application operation simulation device comprising: a designating section configured to designate a position of the nozzle with respect to the spraying device, and a spray shape of the sprayed material sprayed from the nozzle; an interference position calculating section configured to execute the operation program of the robot including commands to output and stop the sprayed material, operate the three-dimensional model of the robot by simulation, and calculate an interference position between a three-dimensional model of the spray shape and the three-dimensional model of the workpiece at predetermined time intervals; an interference count calculating section configured to calculate, at predetermined time intervals, the number of times of interference which has occurred, at each interference position calculated by the interference position calculating section, on a surface of the three-dimensional model of the workpiece; an application time calculating section configured to multiply the number of times of interference calculated by the interference count calculating section by the predetermined time to calculate an application time at each interference position; and a display section configured to color-code and display the surface of the three-dimensional model of the workpiece in accordance with the application time calculated by the application time calculating section" (claim 1).

JP 5340455 B describes "An offline programming apparatus (10) that includes a three-dimensional shape arrangement section (27) configured to fill, with a selected one operation pattern, a selected curved surface or a selected plurality of continuous flat surfaces having a three-dimensional shape, and arrange the three-dimensional shape in a virtual space such that the operation pattern can be projected onto at least one surface of a workpiece model, a machining route creation section (28) configured to project the operation pattern onto at least one surface of the workpiece model to create a machining route for a tool, and a tool position orientation determination section (29) configured to, based on the machining route created and a normal line direction with respect to at least one surface of the workpiece model, automatically determine a position or a position and an orientation of a tool model" (abstract).

SUMMARY OF THE INVENTION

As described in JP 5340455 B, by determining a machining route based on a pre-created operation pattern, man-hours of offline programming are reduced. However, when programming of an application operation is performed by the programming apparatus described in JP 5340455 B, since it is impossible to perform teaching while considering in advance a state where a sprayed material is applied to a workpiece, teaching for the application operation needs to be iterated by trial and error until a desired application state is obtained. There is a demand for a robotic programming apparatus that can appropriately execute a simulation for obtaining an application state of a sprayed material.

An aspect of the present disclosure is a robotic programming apparatus configured to, while using a robot equipped with a spraying device to move the spraying device, create an operation program of an application operation for applying a sprayed material sprayed from a nozzle of the spraying device to a member to be sprayed, the robotic programming apparatus including an operation pattern storage section configured to store a plurality of types of operation patterns each indicating operation of the spraying device, that are each formed of a continuous trajectory including periodic iteration of a constant pattern, and a pitch interval determination section configured to, for one operation pattern among the plurality of types of operation patterns stored in the operation pattern storage section, determine a pitch interval of the periodic iteration of the constant pattern in the one operation pattern based on a spray parameter representing a spray characteristic of the sprayed material by the nozzle of the spraying device.

BRIEF DESCRIPTION OF THE DRAWINGS

The objects, features and advantages of the present invention will become more apparent from the following description of embodiments in connection with the accompanying drawings. In the accompanying drawings.

DETAILED DESCRIPTION

Figure 1:
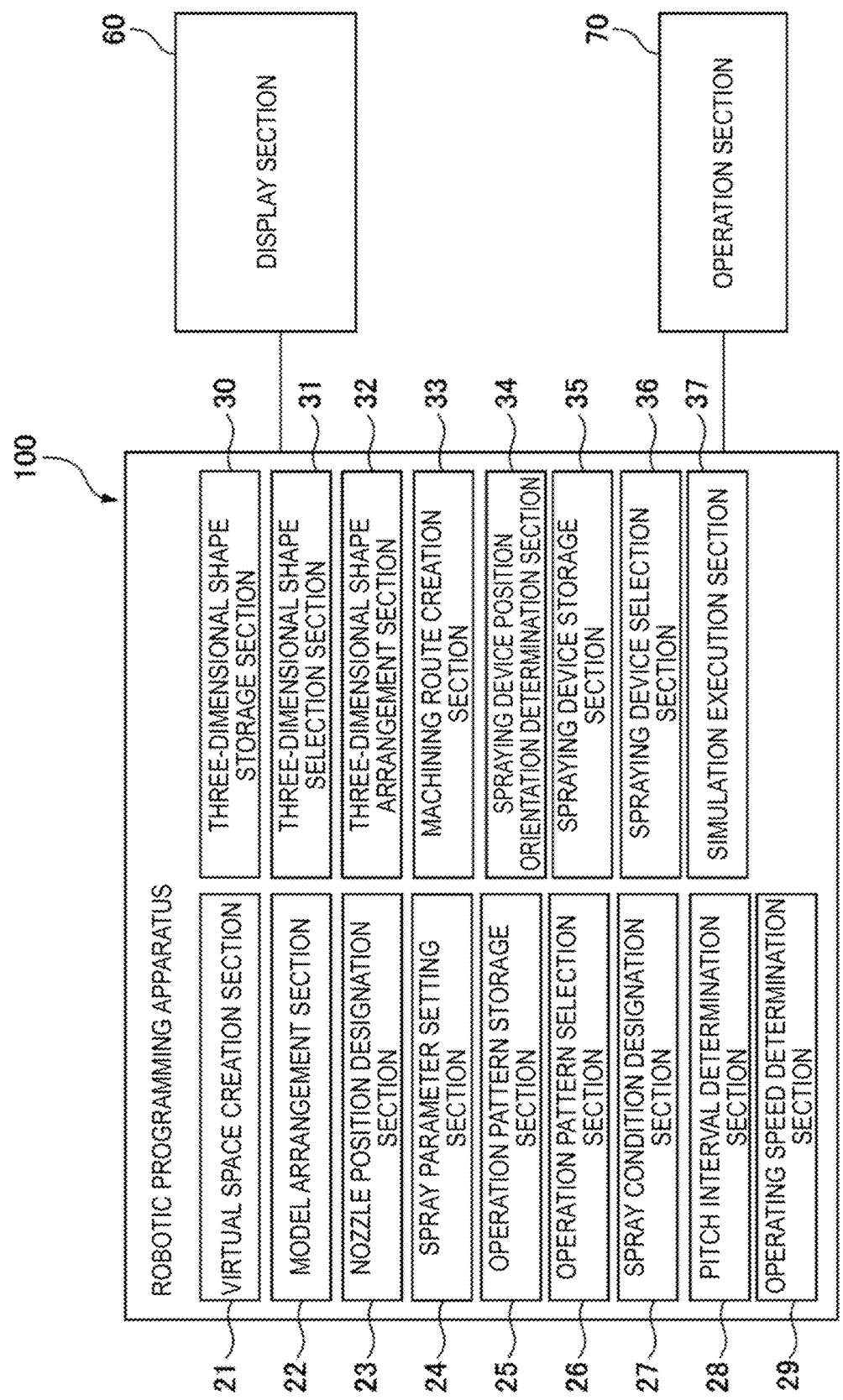
FIG. 1 is a functional block diagram of a robotic programming apparatus according to an embodiment.

Embodiments of the present disclosure will be described below with reference to the accompanying drawings. Throughout the drawings, corresponding components are denoted by common reference numerals. For ease of understanding, these drawings are scaled as appropriate. The embodiments illustrated in the drawings are examples for implementing the present invention, and the present invention is not limited to the embodiments illustrated in the drawings.

Figure 3:
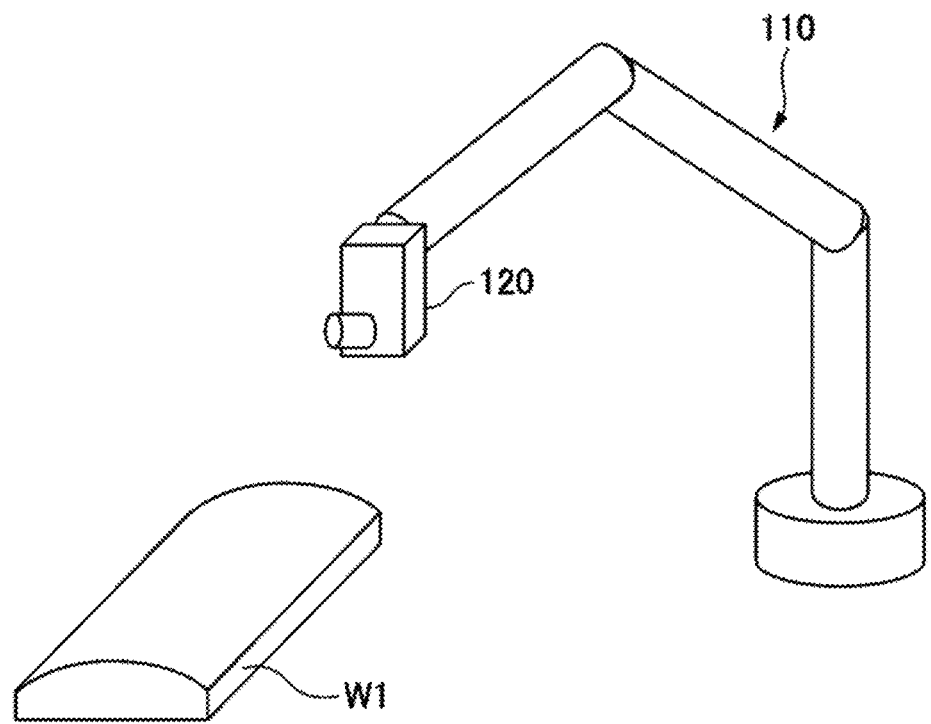
FIG. 3 is a diagram illustrating a state where a robot model, a spraying device model, and a workpiece model are arranged in a virtual space.

FIG. 1 is a functional block diagram of a robotic programming apparatus 100 according to an embodiment. The robotic programming apparatus 100 is an offline programming apparatus that creates an operation program for a robot offline. As an example, the robotic programming apparatus 100 is used to teach offline an operation program for enabling a robot 110 equipped with a spraying device 120 as a tool to perform an application operation to a workpiece W1 as illustrated in FIG. 3. Note that, FIG. 3 illustrates a state where three-dimensional model data of the spraying device 120, the robot 110, and the workpiece W1 is displayed on a display section 60, but, in the present specification, for convenience of explanation, model data of these may be described by object names such as the spraying device 120, the robot 110, and the workpiece W1. The robotic programming apparatus 100 may have a configuration as a general computer including a CPU, a ROM, a RAM, a storage device, an operation section, a display section, an input/output interface, a network interface, and etc. In FIG. 1, the display section 60 and an operation section 70 are also illustrated.

Here, the application operation includes, in addition to a case where a sprayed material such as paint, a release agent or the like is applied to a member to be sprayed (workpiece), various types of operations in each of which a workpiece is sprayed with a sprayed material, such as a blasting process in which an abrasive material is sprayed onto a target workpiece.

The robotic programming apparatus 100 includes a virtual space creation section 21, a model arrangement section 22, a nozzle position designation section 23, a spray parameter setting section 24, an operation pattern storage section 25, an operation pattern selection section 26, a spray condition designation section 27, a pitch interval determination section 28, an operating speed determination section 29, a three-dimensional shape storage section 30, a three-dimensional shape selection section 31, a three-dimensional shape arrangement section 32, a machining route creation section 33, a spraying device position orientation determination section 34, a spraying device storage section 35, a spraying device selection section 36, and a simulation execution section 37. Note that, these functional blocks may be implemented by a CPU of the robotic programming apparatus 100 executing various types of software stored in a storage device, or may be realized mainly by hardware components such as an ASIC (Application Specific Integrated Circuit).

The virtual space creation section 21 creates a virtual space in which a workspace of the robot 110 is three-dimensionally expressed. The model arrangement section 22 arranges a robot model, a spraying device model, and the workpiece model in the virtual space created by the virtual space creation section 21. FIG. 3 illustrates, by way of example, a state where a robot model of the robot 110, a spraying device model of the spraying device 120, and a workpiece model of the workpiece W1 are arranged in a virtual space (displayed on the display section 60). A positional relationship among the robot model, the spraying device model, and the workpiece model corresponds to a positional relationship among the robot 110, the spraying device 120, and the workpiece W1 in a real workspace.

The operation pattern storage section 25 stores a plurality of types of operation patterns each indicating operation of the spraying device 120, and each of the operation patterns is formed of a continuous trajectory including periodic iteration of a constant pattern. The three-dimensional shape storage section 30 stores a three-dimensional shape A2 including a curved surface and a three-dimensional shape A1 including a plurality of flat surfaces that are continuous (see FIG. 11). The operation pattern selection section 26 provides a function of selecting one operation pattern from the plurality of types of operation patterns stored in the operation pattern storage section 25. The three-dimensional shape selection section 31 provides a function of selecting, from the three-dimensional shape storage section 30, the three-dimensional shape A2 including the curved surface or the three-dimensional shape A1 including the plurality of flat surfaces that are continuous.

The three-dimensional shape arrangement section 32 fills, with one operation pattern selected by the operation pattern selection section 26, a curved surface or a plurality of continuous flat surfaces having a three-dimensional shape selected by the three-dimensional shape selection section 31, and arranges the three-dimensional shape in a virtual space such that the operation pattern can be projected onto at least one surface of a workpiece model.

The machining route creation section 33 projects an operation pattern that fills a curved surface or a plurality of flat surfaces having a three-dimensional shape, onto at least one surface of a workpiece model so as to create a machining route for a tool. The spraying device position orientation determination section 34 automatically determines, based on a machining route created by the machining route creation section 33 and a normal line direction of at least one surface of a workpiece model, a position or a position and orientation of a spraying device model.

The nozzle position designation section 23 provides a function of designating a position of a nozzle with respect to a spraying device model. The spray parameter setting section 24 provides a function of setting a spray parameter representing a spray characteristic of a sprayed material by a nozzle of the spraying device 120. The spray condition designation section 27 provides a function of designating a spray condition of a sprayed material by the spraying device 120 (use condition or finish condition of the spraying device). The pitch interval determination section 28 determines, based on the spray parameter and the spray condition, a pitch interval of periodic iteration of a constant pattern included in the operation pattern. The operating speed determination section 29 determines, based on the spray parameter and/or the spray condition, an operating speed of the spraying device 120.

The spraying device storage section 35 stores a plurality of types of three-dimensional models of a spraying device in each of which a position of a nozzle with respect to the spraying device and the spray parameter of a sprayed material sprayed from the nozzle are defined. The spraying device selection section 36 provides a function of selecting a desired spraying device from a plurality of types of spraying device models stored in the spraying device storage section 35. The simulation execution section 37 operates a robot model and a spraying device model in accordance with an operation program in a simulated manner, so as to execute a simulation of an application operation for a workpiece model.

Figure 2:
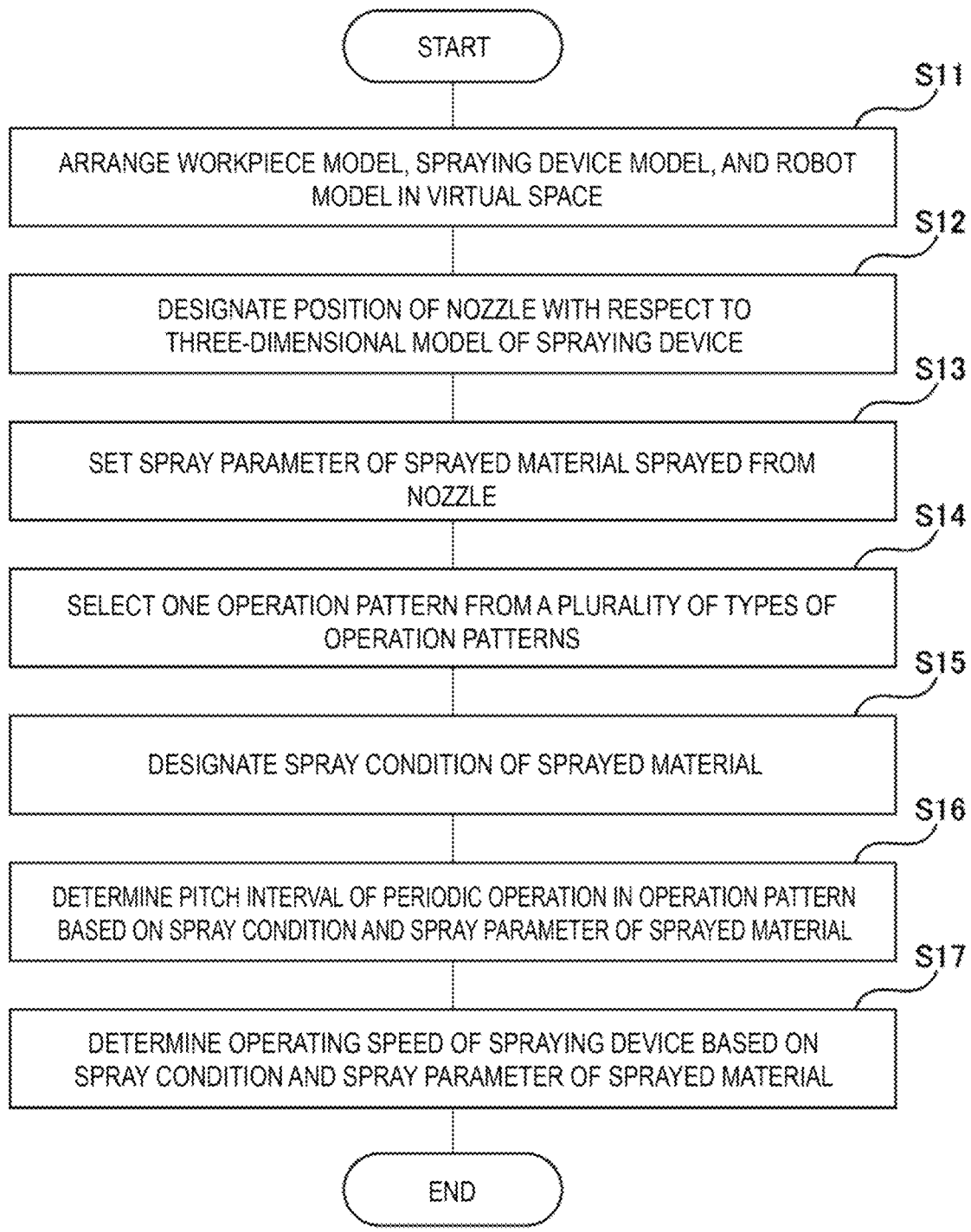
FIG. 2 is a flowchart illustrating pitch interval determination processing.

FIG. 2 is a flowchart illustrating processing for determining, based on the spray parameter and the spray condition, the pitch interval of periodic iteration of a constant pattern included in an operation pattern (hereinafter, also referred to as pitch interval determination processing). Note that, in the pitch interval determination processing, an operating speed of a spraying device may be determined. The pitch interval determination processing in FIG. 2 is executed under control of the CPU of the robotic programming apparatus 100. First, in step S11, the virtual space creation section 21 creates a virtual space representing a workspace and displays the virtual space on the display section 60. Next, a robot model of the robot 110, a spraying device model of the spraying device 120, and a workpiece model of the workpiece W1 are arranged, in accordance with actual arrangement information, in the virtual space by the model arrangement section 22. FIG. 3 illustrates a state where the robot model, the spraying device model, and the workpiece model are arranged in the virtual space by the process in step S11, and displayed on the display section 60.

Figure 4:
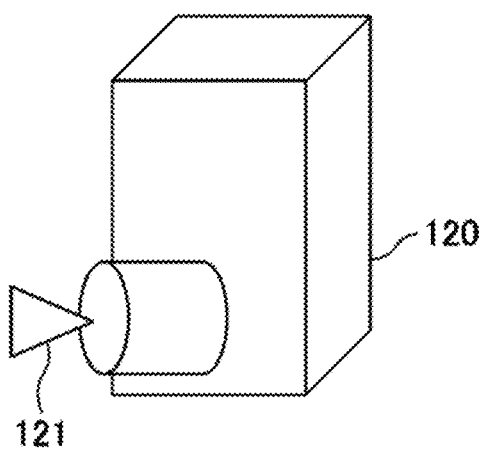
FIG. 4 is a diagram for describing designation of a nozzle position with respect to a spraying device model.

Next, in step S12, the nozzle position designation section 23 accepts designation of a position of a nozzle with respect to the spraying device model. The position of the nozzle is designated, for example, by an operator via the operation section 70. The nozzle position designation section 23 may, as illustrated in FIG. 4 as an example, provide a graphical user interface that accepts an input operation for arranging a nozzle model representing a nozzle 121 at a desired position on the spraying device model. Note that, the position of the nozzle with respect to the spraying device model may be preset. In this case, the process of step S12 can be omitted.

Next, in step S13, the spray parameter setting section 24 accepts setting of the spray parameter. The setting of the spray parameter is performed by, for example, the operator operating the operation section 70.

The spray parameter includes at least one of the following parameters.

A spray shape formed of a maximum reaching distance of a sprayed material sprayed from a nozzle, and a radius of a range in which the sprayed material is applied at the maximum reaching distance A spray amount per a unit time and a unit area (density distribution)

Figure 5:
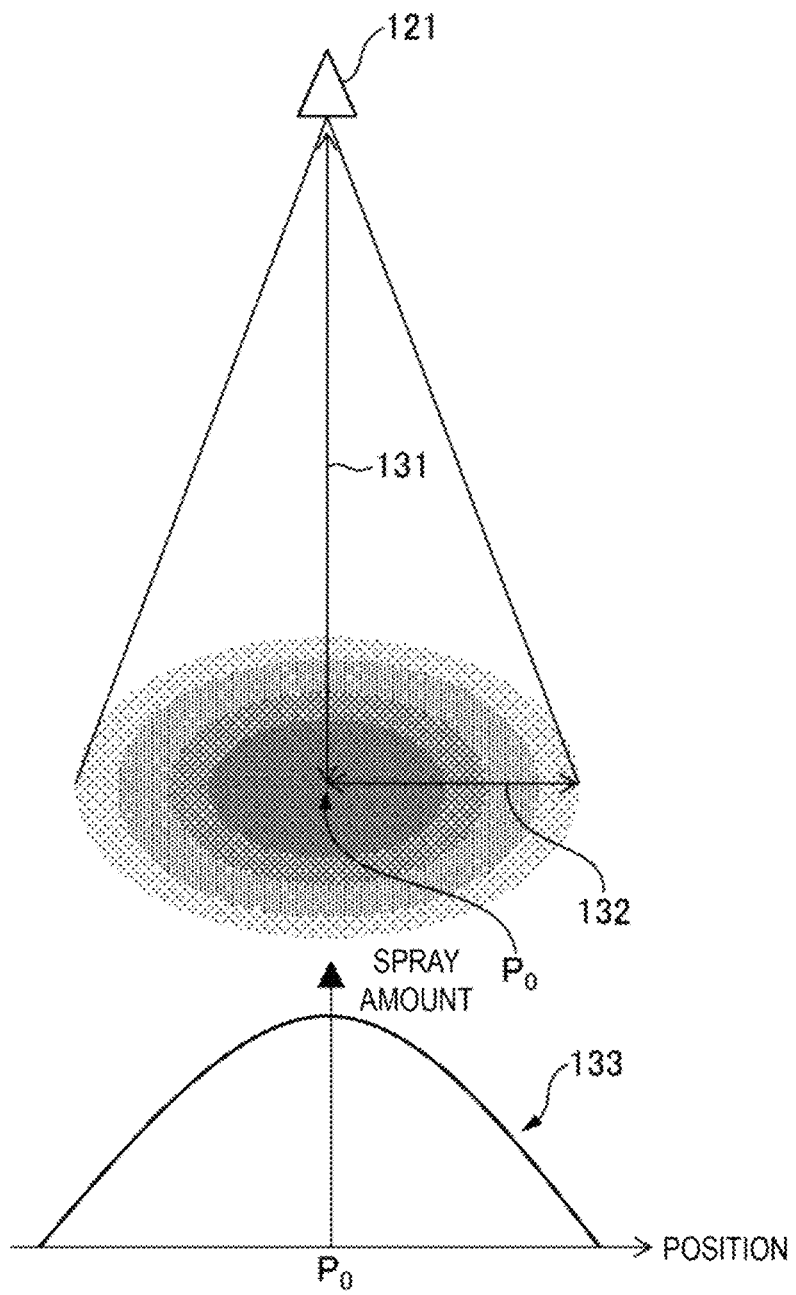
FIG. 5 is a diagram for describing a spray parameter.

FIG. 5 is a diagram for describing the spray parameter, and illustrates a state where a sprayed material is sprayed from the nozzle 121. In FIG. 5, an arrow assigned a sign 131 indicates a maximum reaching distance of the sprayed material sprayed from the nozzle 121, and an arrow assigned a sign 132 indicates the radius of the range in which the sprayed material is applied at the maximum reaching distance. The maximum reaching distance and the radius determine the spray shape of the sprayed material. Note that, information as the spray parameter may include designation of an external signal of a robot for driving a nozzle (designation of what kind of signal that brings the spraying device 120 into an active state (spraying state)).

A graph 133 in FIG. 5 shows "a spray amount per a constant area (spray amount distribution)" at the maximum reaching distance. The "spray amount per a constant area" is determined from "a spray amount per a unit time and a unit area" as the spray parameter, and a spraying time as a spray condition, as follows.

(spray amount of sprayed material per a constant area)=(spray amount per a unit time and a unit area)×spraying time×(an area of a sprayed region)

Since the sprayed material has density distribution, distribution (spray amount distribution) occurs in "the spray amount of the sprayed material per a constant area" calculated as described above. As shown in graph 133, the spray amount distribution is a distribution in which the spray amount, with a center position Po on a central axis of a nozzle as a peak, decreases gradually as a distance from the central position Po increases. Note that, here, a case has been described in which the operator inputs the spray parameter via the operation section 70; however, the spray parameter may be inputted from an external device to the robotic programming apparatus 100 via a network.

Figure 6:
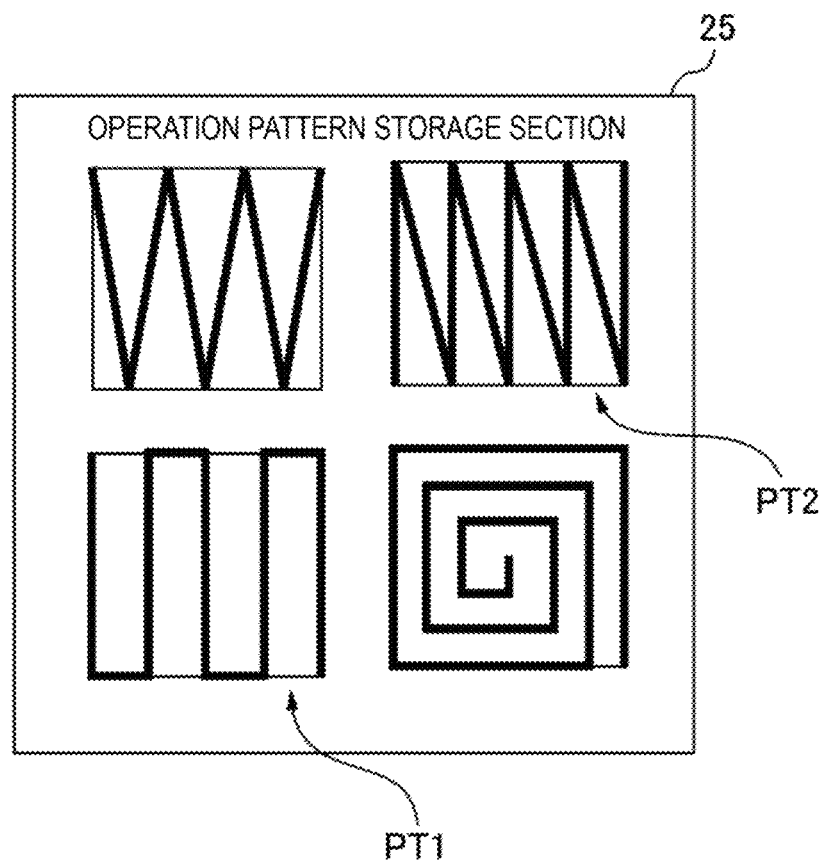
FIG. 6 is a diagram illustrating a plurality of types of operation patterns stored in an operation pattern storage section.

Next, in step S14, the operation pattern selection section 26 accepts an operation of selecting one from the plurality of types of operation patterns stored in the operation pattern storage section 25. FIG. 6 illustrates examples of operation patterns stored in the operation pattern storage section 25. In step S14, a graphical user interface that displays the plurality of types of operation patterns illustrated in FIG. 6 may be provided to accept selection of an operation pattern by a user operation.

Next, in step S15, the spray condition designation section 27 accepts designation of the spray condition. The spray condition includes at least one of a spraying time, a spray amount of a sprayed material per a constant area, or a film thickness. Next, the pitch interval determination section 28 determines, based on the spray parameter designated in step S13 and the spray condition designated in step S15, the pitch interval of periodic iteration of the constant pattern in the operation pattern selected in step S14 (step S16). The operating speed determination section 29 determines, based on the spray parameter and/or the spray condition, an operating speed when the spraying device 120 is operated in the operation pattern selected in step S14 (step S17).

Details of the determination of the pitch interval and the operating speed will be described below. In a case of an operation pattern PT1 including a U-shaped iteration pattern, a pitch interval D and a stroke length L are defined as in FIG. 7. For example, when the spraying time is given as the spray condition, the operating speed of the spraying device 120 is determined as follows.

operating speed=(route length)/(spraying time)

Here, a route length may be set from an entire route length or a stroke length of the operation pattern for which the pitch interval is determined.

Figure 7:
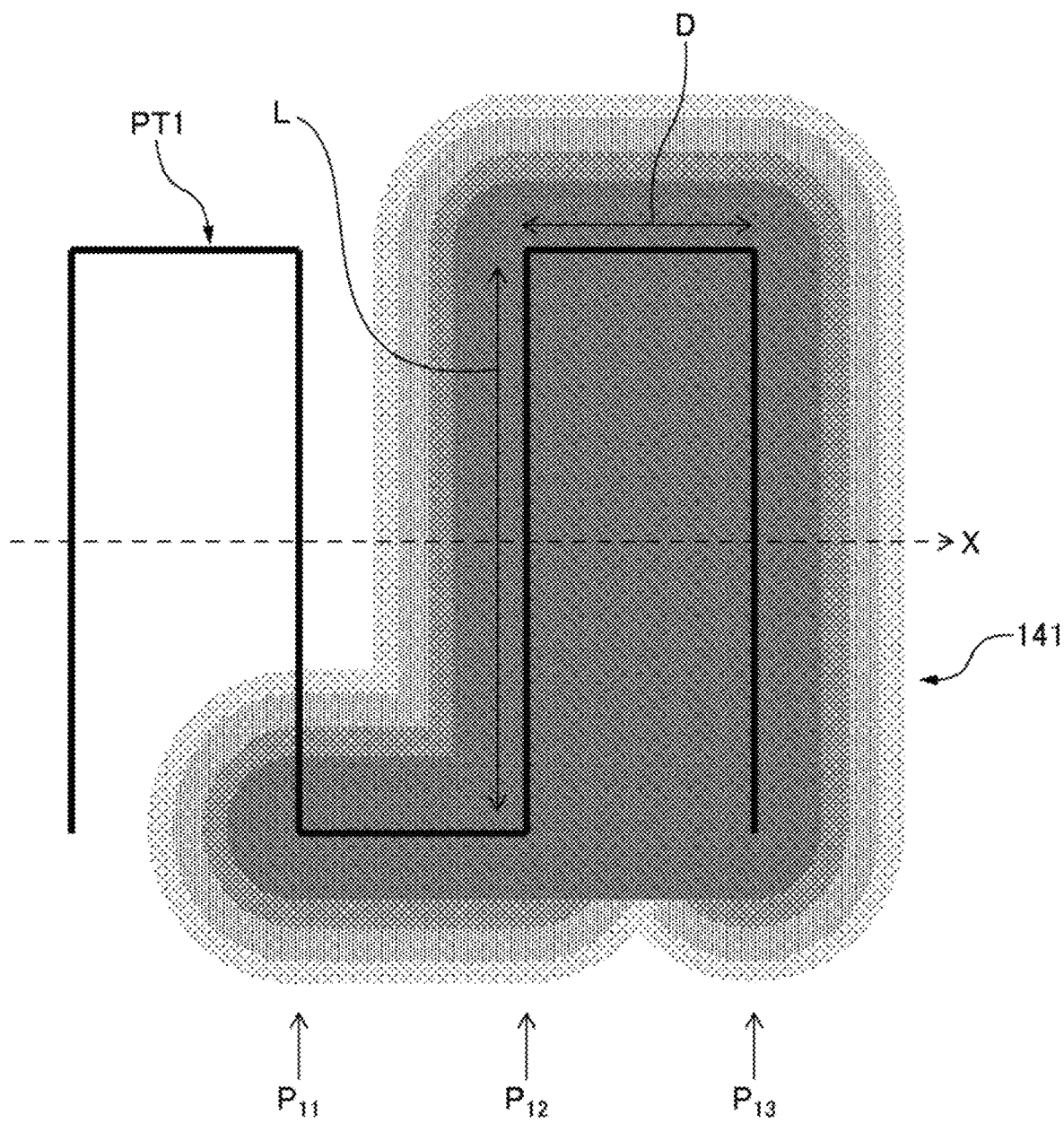
FIG. 7 is a diagram illustrating pitch intervals and strokes in an operation pattern.
Figure 8:
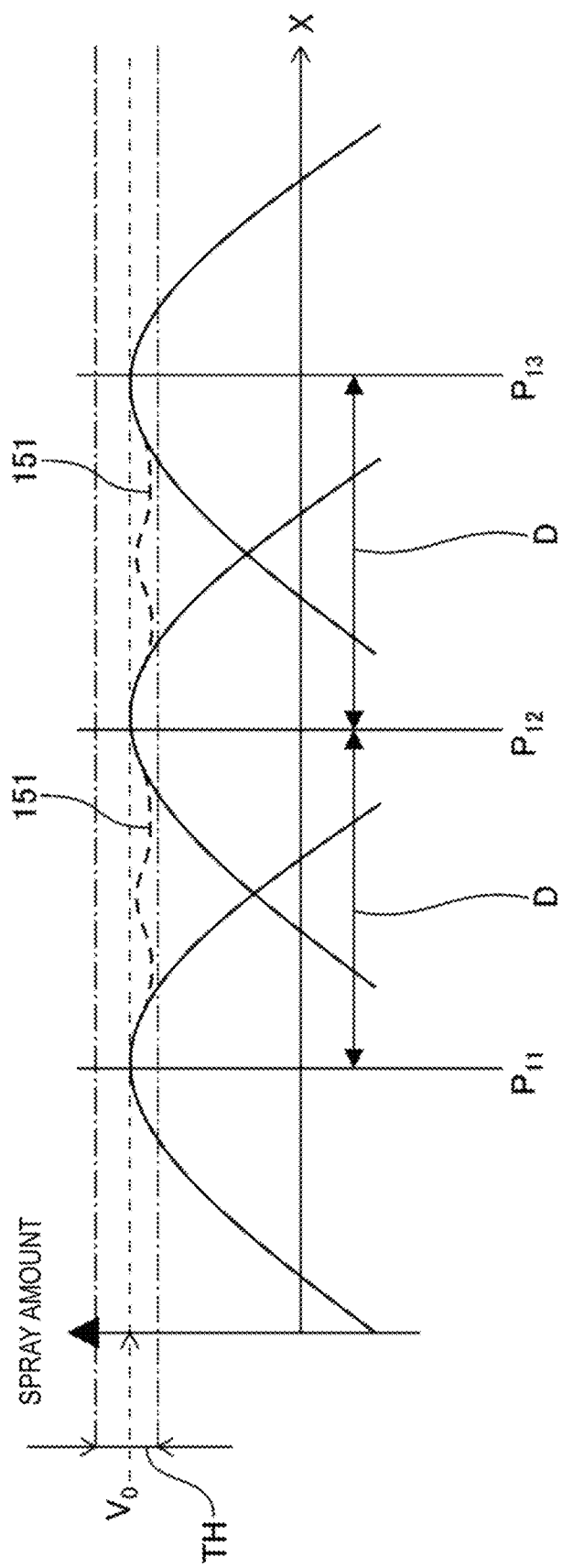
FIG. 8 is a diagram illustrating distribution of spray amount in an axis line X direction that is a direction along the pitch interval in FIG. 7.

FIG. 7 also illustrates a state where a sprayed material 141 is applied along a part of the operation pattern PT1. In the determination of the pitch interval D, based on the spray amount distribution of the sprayed material (density distribution) illustrated in FIG. 5, the determination is performed such that an overall spray amount is uniform in a range in which the sprayed material is applied, in consideration of overlap of the sprayed material. Note that, when a relationship between the spray amount and a film thickness is known, distribution of the film thickness may be determined based on the spray amount distribution, and the pitch interval may be determined such that the film thickness of an entire region in which the sprayed material is applied is uniform. FIG. 8 is a diagram for describing the determination of the pitch interval D, and shows the spray amount distribution in an axis line X direction corresponding to a direction along the pitch interval D in FIG. 7. Note that, in a graph in FIG. 8, a case is assumed where the sprayed material is applied over an entirety of the operation pattern PT1 in FIG. 7. A horizontal axis in the graph of the spray amount distribution in FIG. 8 corresponds to the axis line X illustrated in FIG. 7, and a vertical axis represents the spray amount (or the film thickness) of the sprayed material on the axis line X. As shown in FIG. 8, the spray amount distribution is a distribution in which a peak appears at each of positions $P_{11}$, $P_{12}$, and $P_{13}$ of respective strokes L in the operation pattern PT1. Between adjacent positions of the positions $P_{11}$, $P_{12}$, and $P_{13}$, distributed spray amounts adjacent to one another overlap with each other, and thus the spray amount is a total of the overlapping spray amounts. The spray amount distribution after the totaling at the overlapping portion between the respective distributed spray amounts adjacent to one another is illustrated in FIG. 8 by a dashed line (assigned a sign 151).

Here, a permissible range TH having the center at a peak value $V_0$ of the spray amount is set, and when the spray amount distribution after the totaling falls within the permissible range TH, the spray amount is regarded to be uniform. The pitch interval D is adjusted to search for a value such that spray amount distribution after the totaling falls within the permissible range TH. Since it is comparatively easy to achieve uniform spray amount distribution in a case of the operation pattern PT1 in which the respective strokes (respective lines) are parallel, a comparatively small value can be set as a value of the permissible range TH. On the other hand, when an interval between adjacent lines is not constant as in an operation pattern PT2 (see FIG. 6), a value that is comparatively large may be set to the permissible range TH, to widen a permissible range of spray amount distribution that is regarded to be uniform.

The pitch interval and the operating speed determined as described above are stored in the operation pattern storage section 25, in association with the targeted operation pattern (here, the operation pattern PT1). In the machining route determination processing described later, the pitch interval and the operating speed stored here are to be used.

According to the pitch interval determination processing described above, it is possible to automatically determine the pitch interval for achieving a uniform spray amount (film thickness) for an operation pattern, and it is possible to appropriately execute a simulation for obtaining an application state of a sprayed material.

Note that, in the above description, the pitch interval is determined after determining the spray amount distribution in a constant spray region, but the pitch interval may be determined from density distribution of a sprayed material as the spray parameter.

Figure 9:
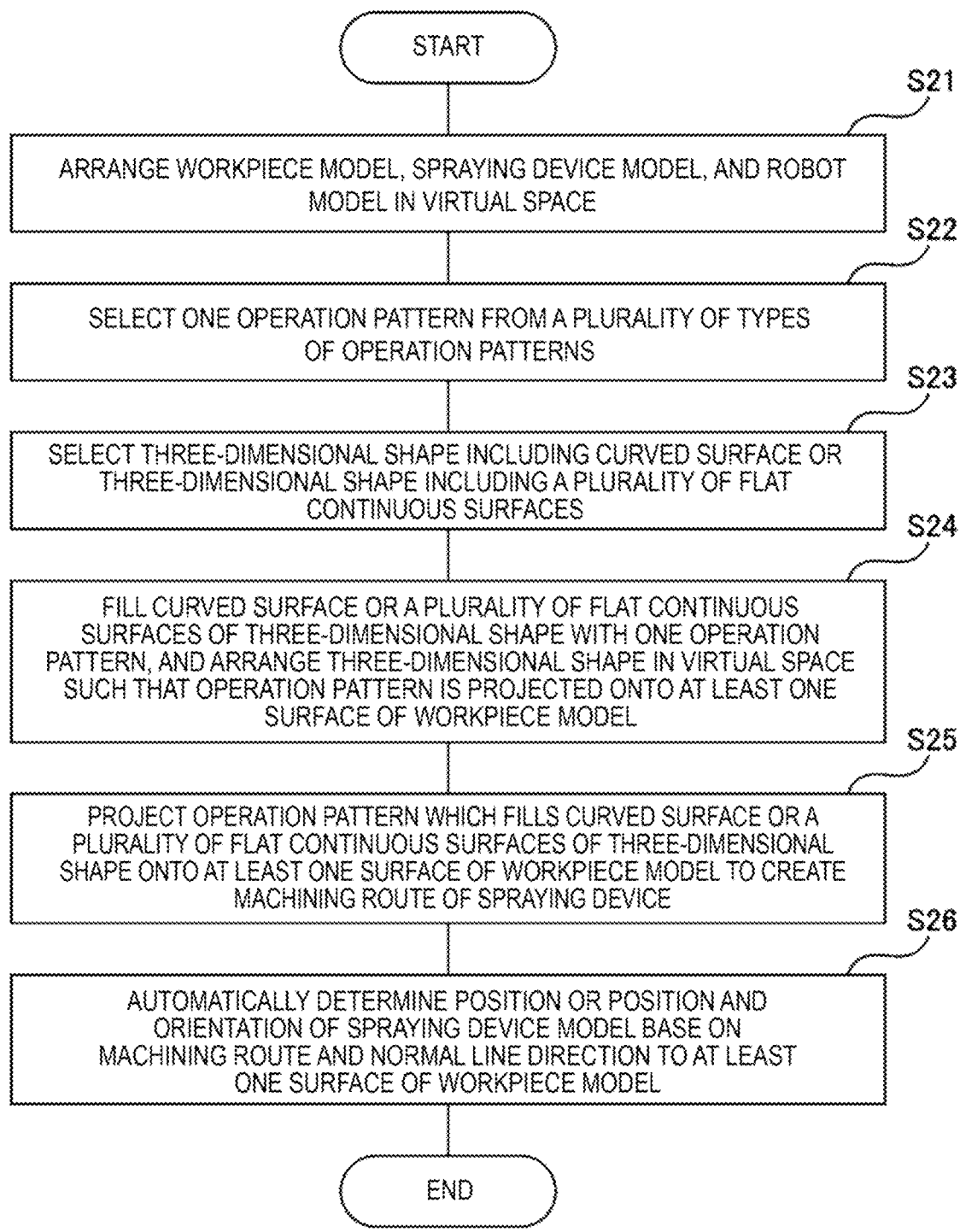
FIG. 9 is a flowchart illustrating machining route determination processing.
Figure 10:
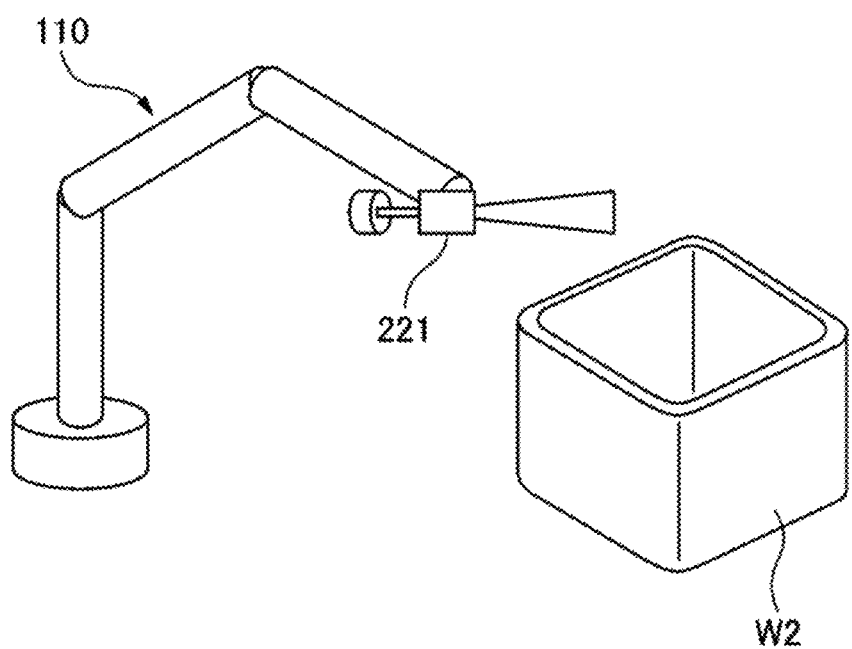
FIG. 10 is a diagram illustrating a state where a robot model, a spraying device model, and a workpiece model are arranged in a virtual space.

FIG. 9 is a flowchart illustrating processing for determining a machining route of the spraying device 120 (machining route determination processing). This machining route determination processing is performed under control of the CPU of the robotic programming apparatus 100. First, in step S21, the virtual space creation section 21 creates a virtual space representing a workspace and displays the virtual space on the display section 60. Next, the model arrangement section 22 arranges a robot model, a spraying device model, and a workpiece model in the virtual space according to actual arrangement information. As an example, in FIG. 10, a state where a robot model of the robot 110, a spraying device model of a spraying device 221, and a workpiece model of a workpiece W2 are arranged, and displayed on the display section 60 is indicated.

Next, in step S22, the operation pattern selection section 26 accepts an operation of selecting one from the plurality of types of operation patterns stored in the operation pattern storage section 25. Here, it is assumed that the operator has performed the pitch interval determination processing in FIG. 2 in advance, and that an operation pattern for which the pitch interval and the operating speed have been set for the spraying device (here, the spraying device 221) used in an intended application operation is selected.

Figure 11:
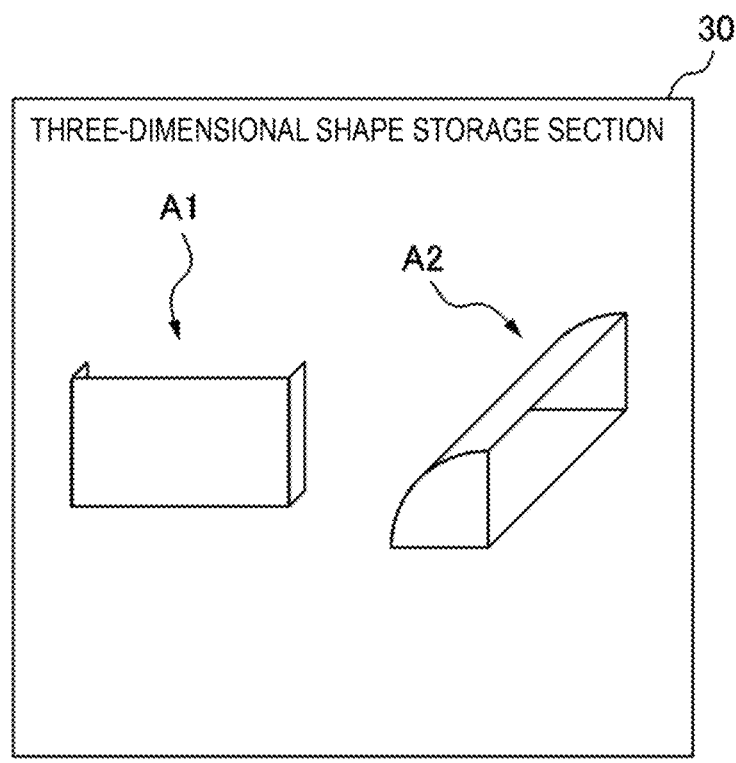
FIG. 11 is a diagram illustrating a plurality of types of three-dimensional shapes stored in a three-dimensional shape storage section.

Next, in step S23, the three-dimensional shape selection section 31 accepts an operation of selecting one from the plurality of types of three-dimensional shapes stored in the three-dimensional shape storage section 30. As an example, as illustrated in FIG. 11, it is assumed that the three-dimensional shape A1 including a plurality of flat continuous surfaces, and the three-dimensional shape A2 including a curved surface are stored in the three-dimensional shape storage section 30. Hereinafter, the description continues assuming that the operation pattern PT1 is selected, and the three-dimensional shape A1 including the plurality of flat continuous surfaces is selected.

Next, in step S24, the three-dimensional shape arrangement section 32 fills the plurality of flat continuous surfaces of the selected three-dimensional shape A1, with the operation pattern PT1. Then, the three-dimensional shape arrangement section 32 arranges the three-dimensional shape filled, in the virtual space on the display section 60.

Figure 12:
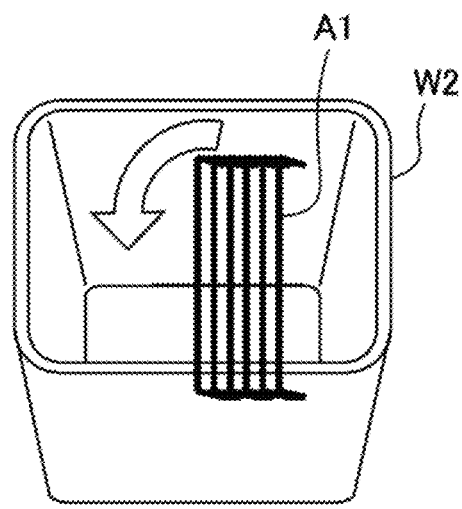
FIG. 12 is a diagram for describing positioning of a three-dimensional shape with respect to a workpiece model and projection of an operation pattern.

FIG. 12 to FIG. 15 are diagrams each for describing positioning of the three-dimensional shape, and projection of the operation pattern, with respect to the workpiece model (workpiece W2). As illustrated in FIG. 12, when the three-dimensional shape arrangement section 32 simply arranges the three-dimensional shape A1 in the virtual space on the display section 60, the three-dimensional shape A1 is not suitably oriented with respect to the workpiece model in some cases.

Figure 13:
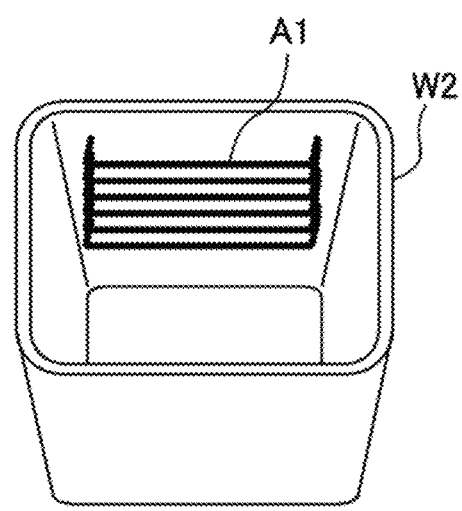
FIG. 13 is a diagram for describing positioning of the three-dimensional shape with respect to the workpiece model and projection of the operation pattern.

In such a case, as illustrated in FIG. 12 and FIG. 13, the three-dimensional shape arrangement section 32 changes the orientation of the three-dimensional shape A1 to be suitable for the workpiece model. Specifically, the three-dimensional shape A1 is positioned such that the plurality of flat continuous surfaces of the three-dimensional shape A1 are parallel to a plurality of inner continuous surfaces of the workpiece model, respectively.

Figure 14:
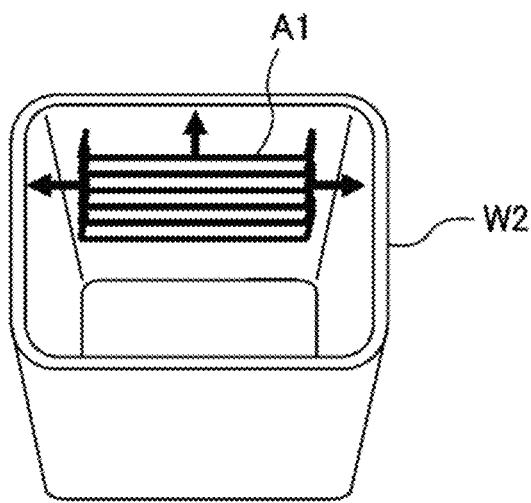
FIG. 14 is a diagram for describing positioning of the three-dimensional shape with respect to the workpiece model and projection of the operation pattern.
Figure 15:
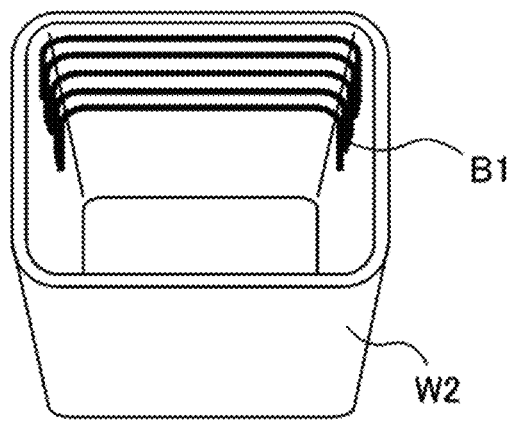
FIG. 15 is a diagram for describing positioning of the three-dimensional shape with respect to the workpiece model and projection of the operation pattern.

In step S25, the machining route creation section 33 projects the operation pattern which fills the plurality of flat continuous surfaces of the three-dimensional shape A1, onto inner surfaces of the workpiece model (workpiece W2). As illustrated in FIG. 14, the operation pattern of each of the flat surfaces of the three-dimensional shape A1 is projected onto the corresponding inner surface of the workpiece model (workpiece W2). As a result, as illustrated in FIG. 15, the projected operation pattern is displayed as a machining route B1 on the plurality of flat continuous surfaces of the workpiece model (workpiece W2).

Figure 16:
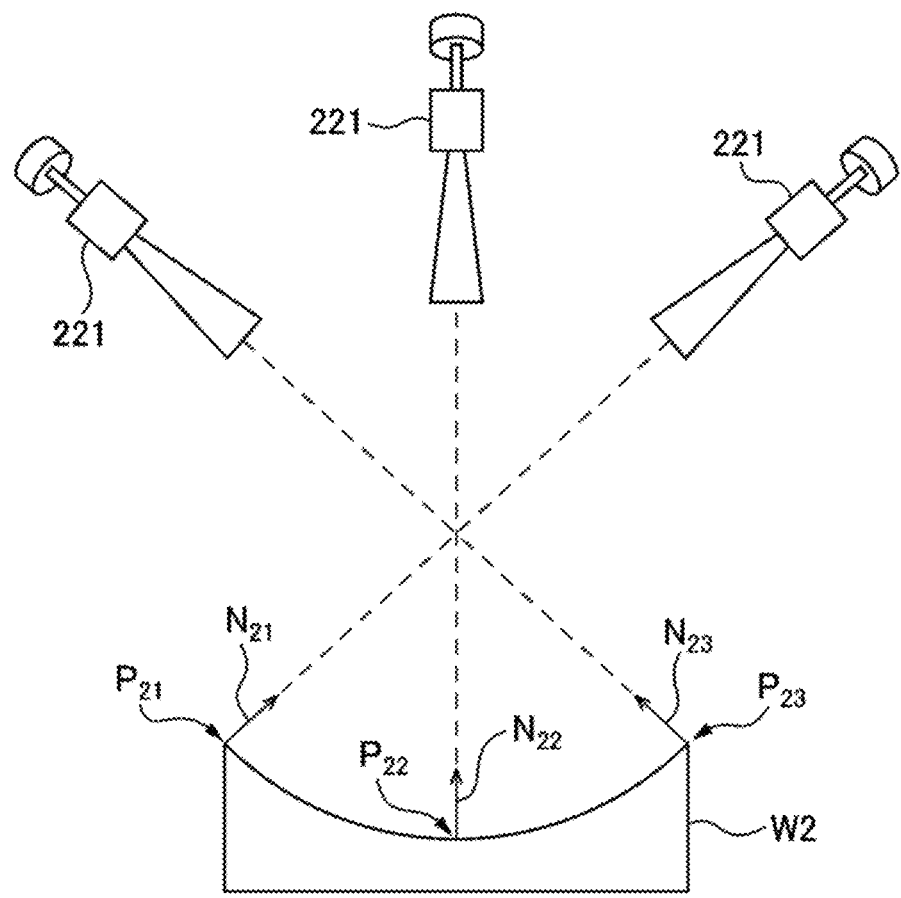
FIG. 16 is a diagram for describing determination of an orientation of a spraying device model with respect to the workpiece model.

Next, in step S26, based on the machining route B1 and a normal line direction with respect to each of the plurality of inner continuous surfaces of the workpiece model (workpiece W2), the spraying device position orientation determination section 34 automatically determines a position or a position and orientation of a model of the spraying device 221. When the spraying device is at a desired angle with respect to the workpiece, for example, when the spraying device 221 is perpendicular to the inner surface of the workpiece W2, the function of the spraying device can be effectively exerted. Here, as illustrated in FIG. 16, the orientations of the spraying device 221 when the application operation is performed with respect to the positions P21, P22, and P23 on the inner surface of the workpiece model (workpiece W2) are determined such that the center axis directions of the spraying device 221 are along normal line directions N21, N22, and N23 with respect to the inner surface at the positions P21, P22, and P23, respectively. Accordingly, in step S26, a position and orientation of the spraying device 221 at a certain position in the machining route B1 is automatically determined by arranging the spraying device 221 so as to form a desired angle with respect to the workpiece W2. The spraying device position orientation determination section 34 sequentially performs such operations along the machining route B1, and thus the position or the position and orientation of the spraying device 221 can be determined throughout the machining route B1.

As described above, in the present embodiment, the operation pattern for filling the plurality of flat continuous surfaces of the three-dimensional shape A1 is projected on the inner surfaces of the workpiece W2 to create the machining route B1 of the spraying device 221. Thus, the created machining route B1 conforms to respective shapes of the inner surfaces of the workpiece W2. Furthermore, in the present embodiment, the position or the position and orientation of the spraying device 221 can be automatically determined based on the above-described machining route B1. Accordingly, even when a surface of the workpiece W to be machined includes a curved portion, for example, a corner portion, the machining route B1 is easily determined, and as a result, man-hours required to determine the position or the position and orientation of the spraying device 221 can be largely reduced.

The machining route determination processing described above may be activated by a predetermined operation for the operation section 70, or may be automatically activated in response to completion of the pitch interval determination processing. When the machining route determination processing is automatically activated, as the spraying device model to be mounted to the robot model in step S21, the spraying device model used in the pitch interval determination processing may be used, and the operation pattern selected in the pitch interval determination processing (S14) may be automatically selected in step S22.

The robotic programming apparatus 100 may have a function of accepting an operation to select a desired spraying device model from a pre-registered plurality of types of spraying device models, virtually mounting a selected spraying device model to a robot model, and applying the selected spraying device model to the pitch interval determination processing and the machining route determination processing described above. Specifically, the spraying device storage section 35 stores three-dimensional models of a plurality of types of spraying devices for which spray parameters are defined. By way of example, FIG. 17A, FIG. 17B, FIG. 17C, and FIG. 17D illustrate four types of spraying devices 120, 321, 221, and 421 stored in the spraying device storage section 35, respectively. For each spraying device model, the spray parameter and the nozzle position are defined. Note that, tool tip points P120, P321, P221, and P421 are defined at forward positions on the central axis lines of nozzles for the spraying devices 120, 321, 221, and 421, respectively, and a machining route is created as an operation trajectory of these tool tip points.

Figure 17A:
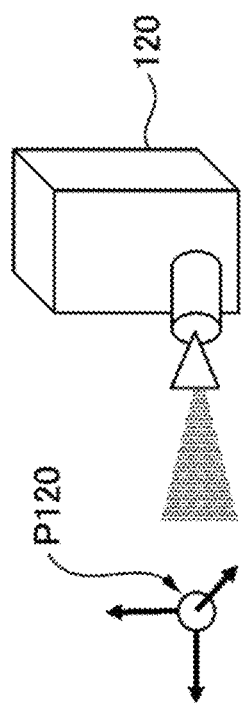
FIGS. 17A to 17D are diagrams illustrating respective four types of spraying devices stored in a spraying device storage section.
Figure 17B:
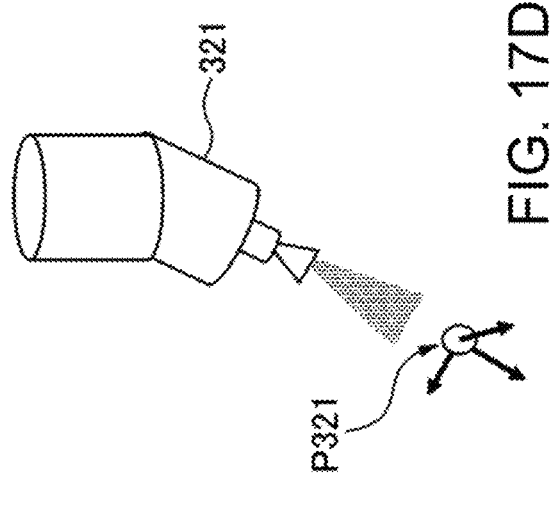
Figure 17C:
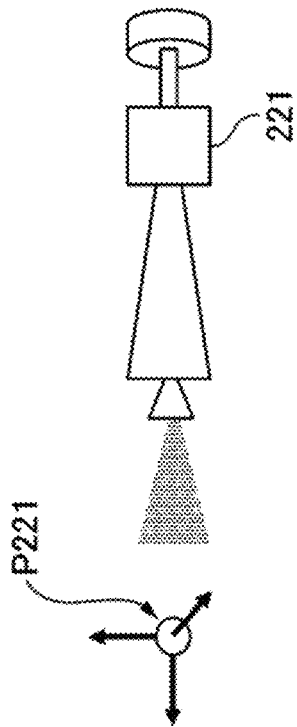
Figure 17D:
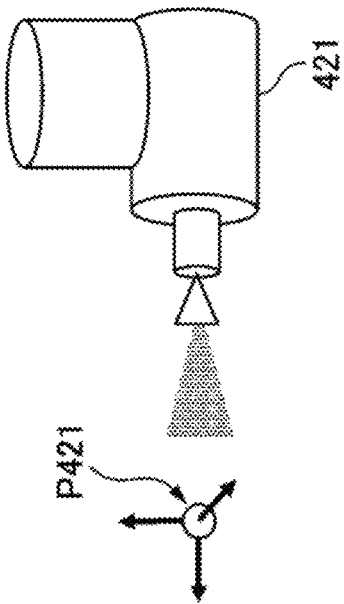
Figure 18:
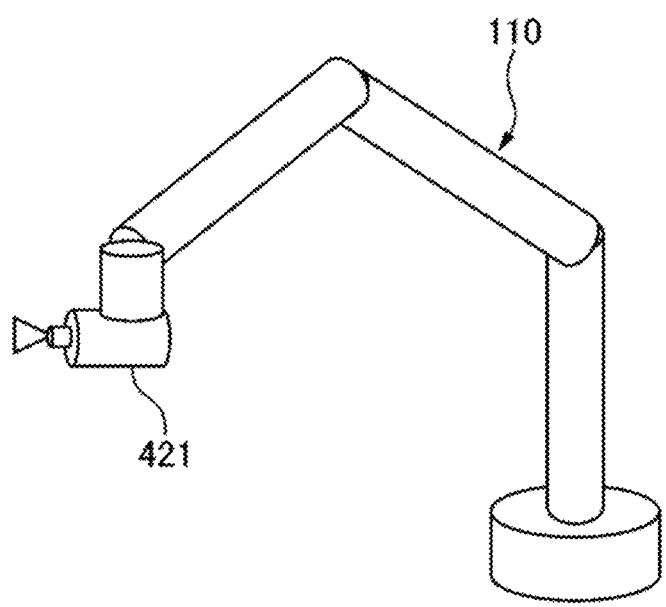
FIG. 18 is a diagram illustrating a state where a robot model is mounted with a spraying device model.

The spraying device selection section 36 accepts selection of a spraying device by an operator via the operation section 70. The spraying device selection section 36 may provide a graphical user interface for displaying an image of a model of the spraying device illustrated in each of FIG. 17A to FIG. 17D for accepting selection of the spraying device by a user operation. For example, assume that the spraying device 421 illustrated in FIG. 17D is selected. In this case, the spraying device selection section 36 virtually mounts the spraying device model of the selected spraying device 421 to an arm tip of a robot model of the robot 110 (see FIG. 18). The spraying device selected by the operator in this manner can be used for performing the pitch interval determination processing and the machining route determination processing.

The simulation execution section 37 performs, in a simulated manner, an application operation on a workpiece model by a robot model on which a spraying device model for which the spray parameter is defined is virtually mounted, in accordance with an operation program in a virtual space in which the workpiece model is arranged. In this case, the robot model is mounted with a spraying device selected, for example, by a function provided by the spraying device selection section 36, and the operation program reflects the operation pattern, the pitch interval, the operating speed, and the machining route determined, using the selected spraying device, by the pitch interval determination processing and the machining route determination processing described above.

Figure 19:
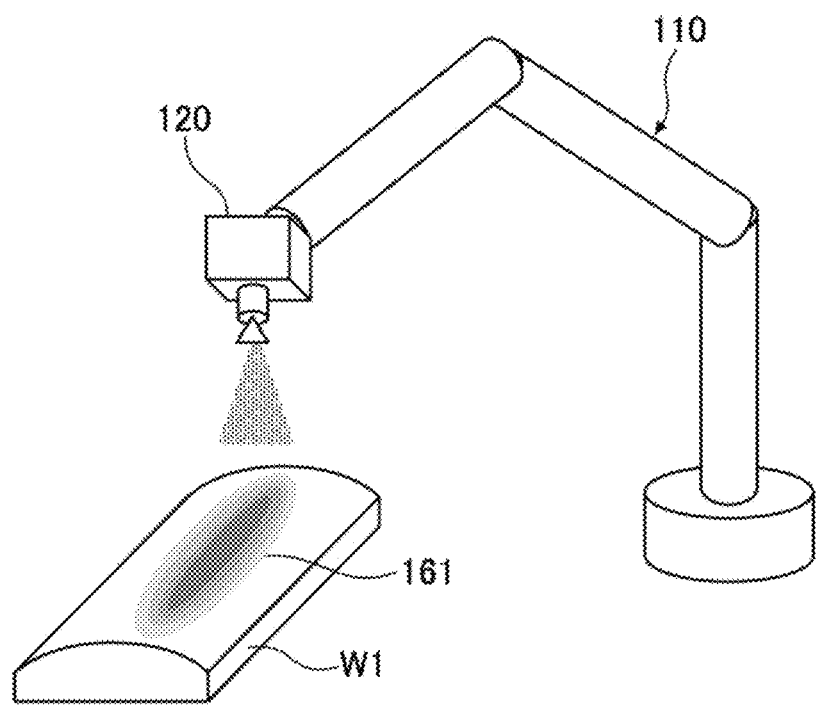
FIG. 19 is a diagram illustrating a simulation result of a painting operation.

FIG. 19 illustrates, as an example, a simulation screen as an operation result obtained by performing a simulation of a painting operation, in accordance with an operation program, for a workpiece model (workpiece W1) using a robot model (robot 110) equipped with a spraying device model (spraying device 120). In the screen of the result of the simulation in FIG. 19, on a surface of the workpiece W1, an image 161 representing applied paint is displayed in a displaying style in which color-coding is performed according to a film thickness. The image 161 representing such an application state is calculated using a tool tip position and an orientation (machining route) of the spraying device model, the spray parameter, the spray condition, a position and shape of the workpiece model, and the like, obtained based on the operation program.

The operator can visually grasp a finished state of the application operation through the screen of the simulation result as illustrated in FIG. 19, and can perform teaching in consideration of a case in advance where a sprayed material is applied to a member to be sprayed. Accordingly, man-hours of the teaching for the application operation can be largely reduced.

Note that, the simulation by the simulation execution section 37 may be activated in response to input of a predetermined operation via the operation section 70, or may be automatically activated in response to completion of the machining route determination processing. In other words, the pitch interval determination processing, the machining route determination processing, and the simulation of an application operation by the simulation execution section 37 may be performed collectively as a single process.

As described above, according to the present embodiment, it is possible to appropriately execute a simulation to obtain an application state of a sprayed material. In other words, when creating an operation program for an application operation, teaching in consideration of a case in advance where the sprayed material is applied to the member to be sprayed can be performed, and man-hours of the teaching can be reduced.

While the disclosure has been described with reference to specific embodiments, it will be understood, by those skilled in the art, that various changes or modifications may be made thereto without departing from the scope of the following claims.

The robotic programming apparatus can be configured by various information processing devices including a personal computer, a laptop computer, a tablet terminal, and the like.

The program for executing various types of processing such as the pitch interval determination processing, machining route determination processing and the like in the above-described embodiments can be recorded on various kinds of computer-readable recording media (e.g., semiconductor memories such as ROM, EEPROM, flash memory or the like, magnetic recording media, optical disks such as CD-ROM, DVD-ROM or the like).

The invention claimed is:

1. A robotic programming apparatus configured to, while using a robot equipped with a spraying device to move the spraying device, create an operation program of an application operation for applying a sprayed material sprayed from a nozzle of the spraying device to a member to be sprayed, the robotic programming apparatus comprising:
   an operation pattern storage section configured to store a plurality of types of operation patterns each indicating operation of the spraying device, that are each formed of a continuous trajectory including periodic iteration of a constant pattern; and
   a pitch interval determination section configured to, for one operation pattern among the plurality of types of operation patterns stored in the operation pattern storage section, determine a pitch interval of the periodic iteration of the constant pattern in the one operation pattern based on a spray parameter representing a spray characteristic of the sprayed material by the nozzle of the spraying device.

2. The robotic programming apparatus according to claim 1, wherein the pitch interval determination section determines the pitch interval such that a film thickness or a spray amount of the sprayed material on the member to be sprayed is uniform, when the sprayed material is sprayed onto the member to be sprayed while the spraying device is moved along the one operation pattern.

3. The robotic programming apparatus according to claim 1, wherein the pitch interval determination section determines the pitch interval further based on a spray condition including at least one of a spraying time, a spray amount of the sprayed material per a constant area, and a film thickness.

4. The robotic programming apparatus according to claim 3, further comprising an operating speed determination section configured to determine an operating speed when the spraying device is moved along the one operation pattern, based on the spray parameter and the spray condition.

5. The robotic programming apparatus according to claim 3, further comprising:
   a virtual space creation section configured to create a virtual space in which a workspace is three-dimensionally expressed;
   a model arrangement section configured to, based on arrangement information of the robot, the spraying device, and the member to be sprayed in the workspace, arrange a three-dimensional model of the robot, a three-dimensional model of the spraying device, and a three-dimensional model of the applied member in the virtual space;
   a nozzle position designation section configured to accept an input operation for designating a position of the nozzle with respect to the three-dimensional model of the spraying device;
   a spray parameter setting section configured to accept an input operation for setting the spray parameter;
   a spray condition designation section configured to accept an input operation for designating the spray condition; and
   an operation pattern selection section configured to accept an input operation for selecting one operation pattern among a plurality of types of operation patterns stored in the operation pattern storage section.

6. The robotic programming apparatus according to claim 5, further comprising:
   a three-dimensional shape storage section configured to store a three-dimensional shape including a curved surface and a three-dimensional shape including a plurality of flat continuous surfaces;
   a three-dimensional shape selection section configured to accept an input operation for selecting the three-dimensional shape including the curved surface or the three-dimensional shape including the plurality of flat continuous surfaces from the three-dimensional shape storage section;
   a three-dimensional shape arrangement section configured to fill the curved surface or the plurality of flat continuous surfaces of the three-dimensional shape selected by the three-dimensional shape selection section with the one operation pattern for which the pitch interval is determined by the pitch interval determination section, and arrange the three-dimensional shape in the virtual space such that the one operation pattern is projected onto at least one surface of the three-dimensional model of the member to be sprayed;
   a machining route creation section configured to project the one operation pattern for filling the curved surface or the plurality of flat continuous surfaces of the three-dimensional shape onto the at least one surface of the three-dimensional model of the member to be sprayed so as to create a machining route for the three-dimensional model of the spraying device; and
   a spraying device position orientation determination section configured to, based on the machining route created by the machining route creation section and a normal line direction with respect to the at least one surface of the three-dimensional model of the applied member, automatically determine a position or a position and orientation of the three-dimensional model of the spraying device.

7. The robotic programming apparatus according to claim 6, further comprising a simulation execution section configured to, based on the machining route created by the machining route creation section, and the position and orientation of the three-dimensional model of the spraying device determined by the spraying device position orientation determination section, execute a simulation of an application operation for applying a sprayed material sprayed from the nozzle onto the three-dimensional model of the member to be sprayed while moving the three-dimensional model of the spraying device.

8. The robotic programming apparatus according to claim 5, further comprising:
- a spraying device storage section configured to store a plurality of types of three-dimensional models of spraying devices, for each of which the position of the nozzle with respect to the three-dimension model of the spraying device and the spray parameter are defined; and
- a spraying device selection section configured to accept an input operation for selecting a three-dimensional model of one spraying device from the plurality of types of three-dimensional models of the spraying devices stored in the spraying device storage section, and virtually mount a three-dimensional model of the spraying device selected to an arm tip of the three-dimensional model of the robot.

* * * * *